US012767545B2

(12) United States Patent
Kim et al.

(10) Patent No.: US 12,767,545 B2
(45) Date of Patent: Oct. 20, 2026

(54) METHOD FOR PREPARING NEGATIVE ELECTRODE ACTIVE MATERIAL, FOR LITHIUM SECONDARY BATTERY, COMPRISING SILICA-METAL COMPOSITE, AND NEGATIVE ELECTRODE ACTIVE MATERIAL PREPARED THEREBY

(71) Applicant: GIST (Gwangju Institute of Science and Technology), Gwangju (KR)

(72) Inventors: Heyong Jin Kim, Gwangju (KR); Seok Ho Suh, Gwangju (KR)

(73) Assignee: GIST (Gwangju Institute of Science and Technology), Gwangju (KR)

( * ) Notice: Subject to any disclaimer, the term of this patent is extended or adjusted under 35 U.S.C. 154(b) by 1205 days.

(21) Appl. No.: 17/246,530

(22) Filed: Apr. 30, 2021

(65) Prior Publication Data

US 2021/0253437 A1 Aug. 19, 2021

Related U.S. Application Data

(63) Continuation of application No. PCT/KR2019/009995, filed on Aug. 8, 2019.

(30) Foreign Application Priority Data

Oct. 31, 2018 (KR) ........................ 10-2018-0132514

(51) Int. Cl.
*C01B 33/18* (2006.01)
*C01G 3/02* (2006.01)
(Continued)

(52) U.S. Cl.
CPC .............. *C01B 33/181* (2013.01); *C01G 3/02* (2013.01); *H01M 10/0525* (2013.01)

(58) Field of Classification Search
CPC ........... H01M 2004/027; H01M 4/134; H01M 4/386; C01G 51/04; C01B 33/181
See application file for complete search history.

(56) References Cited

U.S. PATENT DOCUMENTS

2007/0190413 A1 8/2007 Lee et al.
2011/0086271 A1* 4/2011 Lee ...................... H01M 4/366 429/220

(Continued)

FOREIGN PATENT DOCUMENTS

CN 101849306 A 9/2010
CN 102779988 A 11/2012

(Continued)

OTHER PUBLICATIONS

Hou, Shang-Chieh, et al. "Mechanochemical synthesis of Si/Cu3Si-based composite as negative electrode materials for lithium ion battery." Scientific reports 8.1 (2018): 12695. (Year: 2018).*

(Continued)

*Primary Examiner* — Allison Bourke
*Assistant Examiner* — Kayla Elaine Clary
(74) *Attorney, Agent, or Firm* — Studebaker Brackett PLLC

(57) ABSTRACT

A method for preparing a negative electrode active material for a lithium secondary battery according to one aspect of the present invention comprises the steps of: uniformly mixing silicon and metal oxide; and heating or ball-milling the mixture.

10 Claims, 11 Drawing Sheets

(51) Int. Cl.
*C01G 51/04* (2025.01)
*H01M 10/0525* (2010.01)

(56) References Cited

U.S. PATENT DOCUMENTS

| | | | | |
|---|---|---|---|---|
| 2013/0143119 | A1* | 6/2013 | Mah | H01M 4/58 429/231.95 |
| 2013/0252101 | A1* | 9/2013 | Zhou | H01M 4/1395 429/231.5 |
| 2014/0110639 | A1 | 4/2014 | Yamamura | |
| 2014/0147738 | A1* | 5/2014 | Chen | H01M 4/38 429/188 |
| 2017/0194641 | A1 | 7/2017 | Lin et al. | |

FOREIGN PATENT DOCUMENTS

| | | | |
|---|---|---|---|
| CN | 104993104 | A | 10/2015 |
| JP | 2015133258 | A | 7/2015 |
| JP | 2018-060759 | A | 4/2018 |
| KR | 10-2011-0040478 | A | 4/2011 |
| KR | 20160057813 | A | 5/2016 |
| KR | 20170006164 | A | 1/2017 |

OTHER PUBLICATIONS

Zong, Linqi, et al. "Nanopurification of silicon from 84% to 99.999% purity with a simple and scalable process." Proceedings of the National Academy of Sciences 112.44 (2015): 13473-13477. (Year: 2015).*

Provided periodic table from https://sciencenotes.org/periodic-table-2017-edition-black-white/ (Year: 2017).*

Corrias et al. "Iron-silica and nickel-silica nanocomposites prepared by high energy ball milling." Journal of materials research 12.10 (1997): 2767-2772. (Year: 1997).*

Ulgut et al. "XPS studies of SiO2/Si system under external bias." The Journal of Physical Chemistry B 107.13 (2003): 2939-2943. (Year: 2003).*

International Search Report issued in PCT/KR2019/009995; mailed Nov. 15, 2019.

A Reum Park et al., "Si/Co—CoSi2/reduced graphene oxide ternary nanocomposite anodes for Li-Ion batteries with enhanced capacity and cycling stability", Journal of Alloys and Compounds, vol. 724, Jul. 12, 2017, pp. 1134-1142, Elsevier.

Deren Yang et al., "Synthesis of Porous Si/SiO2/C Particles as Anode Materials of Lithium-Ion Batteries", Journal of Nanotechnology and Smart Materials, vol. 1, Mar. 11, 2014, pp. 1-4, JScholar Publishers.

* cited by examiner

METHOD FOR PREPARING NEGATIVE ELECTRODE ACTIVE MATERIAL, FOR LITHIUM SECONDARY BATTERY, COMPRISING SILICA-METAL COMPOSITE, AND NEGATIVE ELECTRODE ACTIVE MATERIAL PREPARED THEREBY

CROSS-REFERENCE TO RELATED APPLICATIONS

This application is a Continuation of International No. Application PCT/KR2019/009995 filed Aug. 8, 2019, which claims benefit of priority to Korean Patent Application No. 10-2018-0132514 filed Oct. 31, 2018, the entire content of which is incorporated herein by reference.

TECHNICAL FIELD

The present invention relates to a method for preparing a negative electrode active material including a silicon oxide-metal composite for a lithium secondary battery negative electrode material using silicon and a metal oxide, a negative electrode active material prepared using the same, and a lithium secondary battery including a negative electrode made of the negative electrode active material. More particularly, the present invention relates to a method for producing a negative electrode active material including a silicon oxide-metal composite for a lithium secondary battery negative electrode material prepared through heating or ball-milling after mixing silicon and a metal oxide, a negative electrode active material prepared using the same, and a lithium secondary battery including a negative electrode made of the negative electrode active material.

BACKGROUND ART

With the growth of the market for large devices such as electric vehicles as well as small devices such as mobile phones, the demand for large-capacity, high-power, and long-life lithium secondary batteries is increasing.

Negative electrode materials constituting a part of the lithium secondary battery are one of the main factors determining its capacity characteristics. Among them, silicon (Si) has a theoretical capacity of about 4200 mAh/g per weight, which is more than ten times that of graphite, a carbon-based negative electrode material used in the past, thus it attracts attention as a negative electrode material for next-generation lithium secondary batteries.

However, silicon is difficult to commercialize due to irreversible capacity resulting from destruction of the electrode containing silicon particles or poor contact with the current collector due to repeated volume expansion and contraction while receiving a large amount of lithium during charging and discharging. For this reason, there has been a continuing demand to solve the problem caused by the change in volume of silicon.

DISCLOSURE

Technical Problem

The present invention is directed to providing a method of preparing a negative electrode active material including a silicon oxide-metal composite that can be used as a negative electrode material for a lithium secondary battery.

The present invention is directed to providing a negative electrode capable of improving a lifespan by solving the issue of irreversible capacity due to volume change, which is a problem of a conventional silicon-based negative electrode, and a lithium secondary battery including the same.

The technical problems to be achieved by the present invention are not limited to the technical problems mentioned above, and other technical problems that are not mentioned can be clearly understood by those of ordinary skill in the technical field to which the present invention belongs from the following description.

Technical Solution

In order to achieve the above technical problems, the present inventors prepared a silicon oxide-metal composite by mixing silicon particles and a metal oxide, and then heating or ball-milling the mixture, and the present invention was completed on the basis of finding that the composite has stable cycle characteristics and excellent rate-limiting characteristics due to the excellent mechanical properties of the metal.

One aspect of the present invention provides a method of preparing a negative active material for a lithium secondary battery including the steps of: uniformly mixing silicon and a metal oxide; and heating or ball-milling the mixture.

According to an embodiment of the present invention, the method may form a silicon oxide-metal composite.

According to an embodiment of the present invention, the silicon oxide-metal composite may be formed by attaching metal particles on silicon oxide particles.

According to an embodiment of the present invention, the silicon oxide may be SiOx ($0 \leq x \leq 2$).

According to an embodiment of the present invention, the metal oxide may be an oxide of one or more selected from the group consisting of Co, Cu, Ni, Mn, Fe, Ti, Al, Sn, Ag, Au, Mo, Zr, $CoSi_2$, $Cu_3Si$, $Cu_5Si$, $MnSi_2$, $NiSi_2$, $FeSi_2$, FeSi, $TiSi_2$, $Al_4Si_3$, $Sn_2Si$, $AgSi_2$, $Au_5Si_2$, $MoSi_2$, and $ZrSi_2$.

According to an embodiment of the present invention, the silicon and the metal oxide may be mixed in a molar ratio of 9:1 to 19:1.

According to an embodiment of the present invention, the heating step may be performed at 400° C. to 2,000° C.

According to an embodiment of the present invention, the ball-milling step may be performed at 100 rpm to 1,500 rpm.

According to an embodiment of the present invention, the silicon may be further treated with an acid prior to the mixing step.

Another aspect of the present invention provides a negative active material for a lithium secondary battery prepared by the above method.

Still another aspect of the present invention provides a negative electrode for a lithium secondary battery including the negative electrode active material.

Yet another aspect of the present invention provides a lithium secondary battery including the negative electrode for a lithium secondary battery.

Yet another aspect of the present invention provides a negative active material for a lithium secondary battery formed by bringing one or more metal elements selected from the group consisting of Co, Cu, Ni, Mn, Fe, Ti, Al, Sn, Ag, Au, Mo, Zr, $CoSi_2$, $Cu_3Si$, $Cu_5Si$, $MnSi_2$, $NiSi_2$, $FeSi_2$, FeSi, $TiSi_2$, $Al_4Si_3$, $Sn_2Si$, $AgSi_2$, $Au_5Si_2$, $MoSi_2$, and $ZrSi_2$ into contact with the surface of silicon oxide particles.

According to an embodiment of the present invention, the silicon oxide and the metal element may be formed in a molar ratio of 1:9 to 999:1.

Advantageous Effects

The method of preparing a negative electrode active material for a lithium secondary battery according to an embodiment of the present invention is to form a silicon oxide-metal composite formed by attaching metal particles to the surface of silicon oxide particles, thereby a composite in which metal particles are uniformly distributed in silicon oxide can be formed.

In addition, according to an embodiment of the present invention, it is possible to provide a lithium secondary battery with an improved lifespan and improved electrochemical performance of a negative electrode for a lithium secondary battery by suppressing volume expansion during the operation (charging/discharging) of the lithium secondary battery.

The effects of the present invention are not limited to the above effects, and it should be understood to include all effects that can be deduced from the configuration of the invention described in the detailed description or claims of the present invention.

BEST MODE

Figure 1:
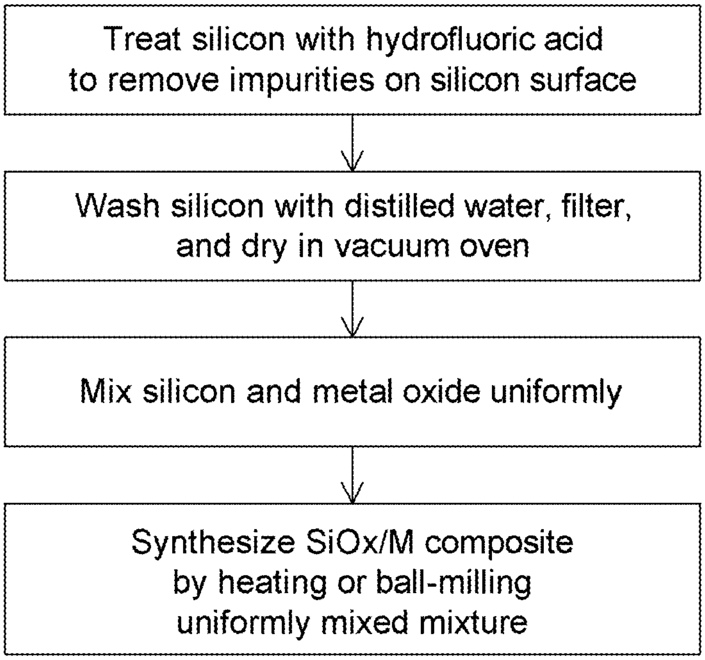
FIG. 1 illustrates a flow chart of a synthesis process of a silicon oxide-metal composite according to an embodiment of the present invention.
Figure 2:
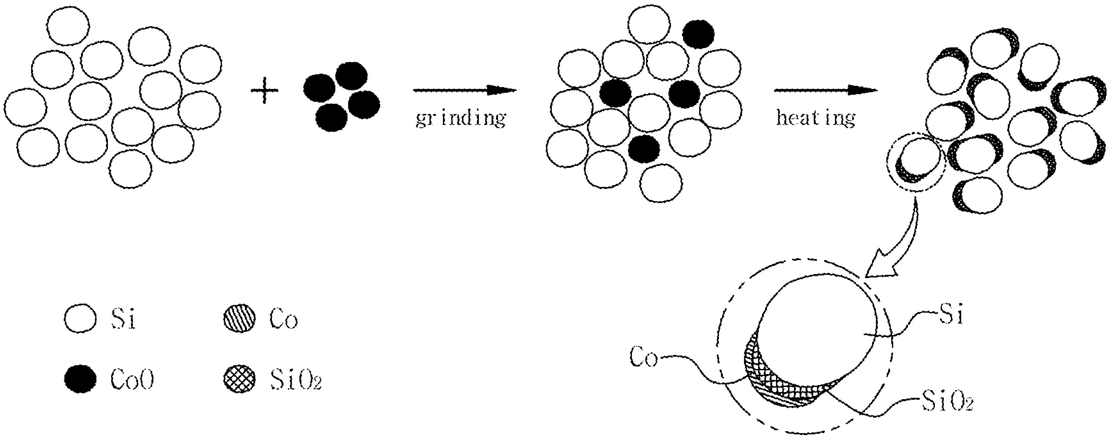
FIG. 2 illustrates a schematic diagram of a reaction according to an embodiment of the present invention.

One aspect of the present invention provides a method of preparing a negative active material for a lithium secondary battery including the steps of uniformly mixing silicon and a metal oxide; and heating or ball-milling the mixture. According to an embodiment of the present invention, the method may form a silicon oxide-metal composite. According to an embodiment of the present invention, the silicon oxide-metal composite may be formed by attaching metal particles on silicon oxide particles.

MODES OF THE INVENTION

Hereinafter, the present invention will be described with reference to the accompanying drawings. However, the present invention may be implemented in several different forms, and therefore is not limited to the embodiments described herein. In the drawings, parts irrelevant to the description are omitted to clearly describe the present invention, and similar reference numerals are attached to similar parts throughout the specification.

Throughout the specification, when a part is said to be “connected (linked, contacted, bonded)” with another part, it includes not only the case of being “directly connected”, but also “indirectly connected” with another member interposed therebetween. In addition, when a part “includes” a certain component, this means that other components may be further provided, not excluded, unless specifically stated to the contrary.

The terms used in the present specification are only used to describe specific embodiments and are not intended to limit the present invention. Singular expressions include plural expressions unless the context clearly indicates otherwise. In the present specification, terms such as “include” or “have” are intended to designate the presence of features, numbers, steps, actions, components, parts, or combinations thereof described in the specification. It is to be understood that it does not preclude the possibility of the presence or addition of one or more other features, numbers, steps, actions, components, parts, or combinations thereof.

As described above, when silicon is used as a negative electrode active material, as the negative electrode repeats expansion and contraction during operation of the lithium secondary battery, the lifespan and electrochemical performance of the negative electrode are reduced. To solve this problem, the present invention has been accomplished to prepare a negative electrode active material more effectively and at low cost.

Hereinafter, exemplary embodiments of the present invention will be described in detail with reference to the accompanying drawings.

FIG. 1 illustrates a flow chart of a synthesis process of a silicon oxide-metal composite according to an embodiment of the present invention.

The method of preparing a negative active material for a lithium secondary battery according to an embodiment of the present invention includes the steps of: (a) uniformly mixing silicon and a metal oxide; and (b) heating or ball-milling the mixture.

The “silicon (Si)” provides a silicon component to the composite, and it is preferable to use a single Si compound. However, in some cases, it may be used as long as it can provide silicon to the silicon oxide-metal composite through heating or ball-milling, for example, SiO, $SiO_2$, $Si(OCHs)_4$ may be used in the form of a single substance or a mixture of two or more.

The particle diameter of the silicon may be 10 nm to 100 μm, for example, 10 nm to 200 nm, or 30 nm to 100 nm.

When the “metal oxide” is formed in the composite, as oxygen atoms are transferred to silicon, the metal can be used without special restrictions as long as it satisfies the following conditions: (i) it does not react with lithium; (ii) it does not react with water, making it suitable for slurry processing; (iii) the binding energy of the metal oxide is low; and (iv) the metal oxide is thermodynamically stable at the temperature and pressure at which the process is performed.

The metal oxide may be an oxide of one or more metal atoms selected from the group consisting of Co, Cu, Ni, Mn, Fe, Ti, Al, Sn, Ag, Au, Mo, and Zr and/or one or more silicon alloys selected from the group consisting of $CoSi_2$, $Cu_5Si$, $Cu_5Si$, $MnSi_2$, $NiSi_2$, $FeSi_2$, FeSi, $TiSi_2$, $Al_4Si_3$, $Sn_2Si$, $AgSi_2$, $Au_5Si_2$, $MoSi_2$ and $ZrSi_2$, and specifically, it may be an oxide of one or more metal atoms selected from the group consisting of Co, Cu, Ni, and Mn.

The particle diameter of the metal oxide may be 5 nm to 100 μm.

The mixing ratio between the silicon and the metal compound has a great influence on the physical properties of the prepared composite. For example, the silicon and the metal oxide may be mixed in a molar ratio of 9:1 to 19:1, such as 13:1. When the mixing ratio of the silicon and metal oxide is less than 8:1, the capacity of the battery may decrease due to the high ratio of the metal oxide remaining in the composite, and when the mixing ratio is more than 30:1, it is difficult to accurately measure the weight of the components during preparation, and since the metal content is too small compared to silicon, the volume expansion effect of the negative electrode cannot be sufficiently obtained.

The method of preparing a negative electrode active material for a lithium secondary battery may further include a step of pre-treating with an acid prior to step (a). In this step, impurities such as oxides present on the surface of the silicon particles may be removed by treating the prepared silicon particles with an acid such as hydrofluoric acid.

Silicon treated with the acid as described above may be washed several times with water, for example, distilled water, filtered, dried, and then used in a mixing process with the metal oxide. The drying may be performed in equipment such as, for example, a vacuum oven or a hot plate, but is not limited thereto.

In step (a), the mixing process is performed so that silicon and metal oxide particles are uniformly mixed.

In step (b), the uniform mixture of silicon/metal oxide obtained in step (a) is heated or ball-milled to perform a process of forming a silicon oxide-metal composite through a solid phase reaction. The silicon oxide-metal composite may be formed by dispersing silicon oxide particles and metal particles, so that the metal particles are attached on silicon oxide particles.

The heating step in step (b) may be performed at 400° C. to 2,000° C., for example, 700° C., under an inert atmosphere such as argon (Ar) and nitrogen ($N_2$). When the heating step is performed at less than 400° C., it is difficult for the complex formation reaction to occur, and when the heating step is more than 2,000° C., rapid growth of silicon crystals may occur. In addition, the heating step may be performed for 15 hours to 45 hours, for example, 30 hours.

The ball-milling step in step (b) may be performed at 100 rpm to 1,500 rpm for 1 hour to 24 hours.

A method of preparing a silicon oxide-metal composite by the preparation method of the present invention enables synthesis at a relatively low temperature within a short time using a metal oxide, thus mass production is possible at low cost. In addition, in the silicon oxide-metal composite prepared by the above method, as the metal particles are uniformly attached to the surface of the silicon oxide particles, when looking at an entire negative electrode, metal atoms are uniformly distributed between silicon oxide particles. This uniform distribution can make it possible to exert a buffering effect more effectively by the metal particles. Accordingly, the negative electrode made of the silicon oxide-metal composite according to the preparation method of the present invention may have an excellent lifespan and excellent electrochemical performance.

Further, in the negative electrode made of the silicon oxide-metal composite according to the preparation method of the present invention, referring to FIGS. 8A to 8F, which is an SEM image after 100 cycles of charging and discharging, micro-cracks were hardly generated, and particles did not aggregate compared to a silicon electrode. This means that the silicon oxide-metal composite according to the preparation method of the present invention can prevent deterioration of the electrode due to volume expansion and contraction of the silicon particles.

EXAMPLES

Example 1. Preparation of Silicon Oxide-Cobalt Composite

In order to prepare a silicon oxide-cobalt composite, silicon (Si, diameter 100 nm) and cobalt oxide (CoO, diameter 50 nm) were prepared in a molar ratio of 19:1.

The prepared silicon was immersed in 500 ml of hydrofluoric acid and allowed to stand for 1 hour, and then washed three times with distilled water. Then, it was dried in a vacuum oven at 80° C. for 3 hours.

The dried silicon and cobalt oxide were put in one place, and the two materials were mixed for about 1 hour using a mortar so that they were homogeneously mixed. The prepared mixture was placed in an alumina crucible and heated at 700° C. for 30 hours under a nitrogen gas atmosphere. After heating, it was allowed to cool naturally at room temperature, thereby obtaining a silicon oxide-cobalt composite.

Figure 3:
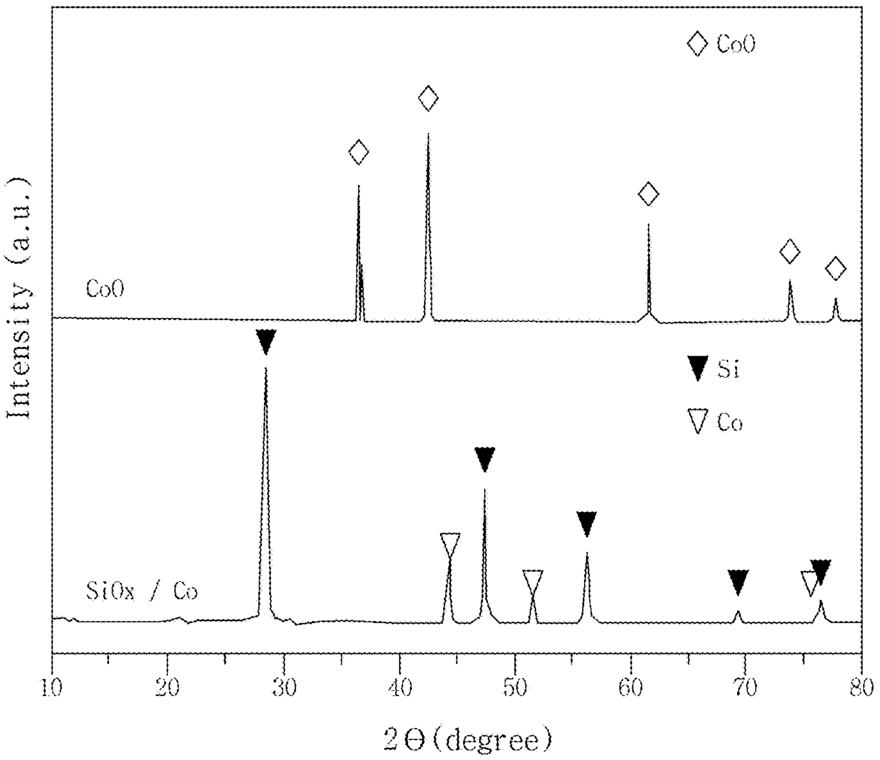
FIG. 3 illustrates the XRD result pattern of heat-treated ‘CoO+Si’ according to an embodiment of the present invention and a heat-treated material of only ‘CoO’ as a comparative example.

The obtained composite powder was analyzed using XRD (FIG. 3). As can be seen in FIG. 3, in the case of the powder obtained in Example 1, a composite including silicon (black diamond) and cobalt (red diamond) was formed, and it was found that cobalt oxide was reduced to cobalt metal.

In contrast, when only cobalt oxide was heated at 900° C. for 30 hours and analyzed using XRD, it was confirmed that only cobalt oxide (green diamond) was included (FIG. 3).

Figure 4:
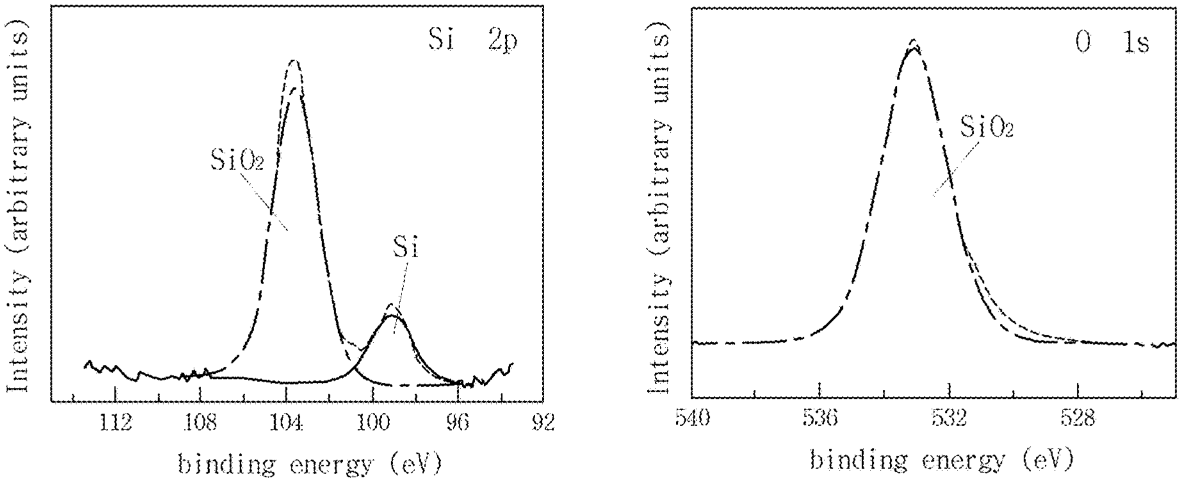
FIG. 4 illustrates the results of XPS analysis of the composite obtained according to an embodiment of the present invention.
Figure 5:
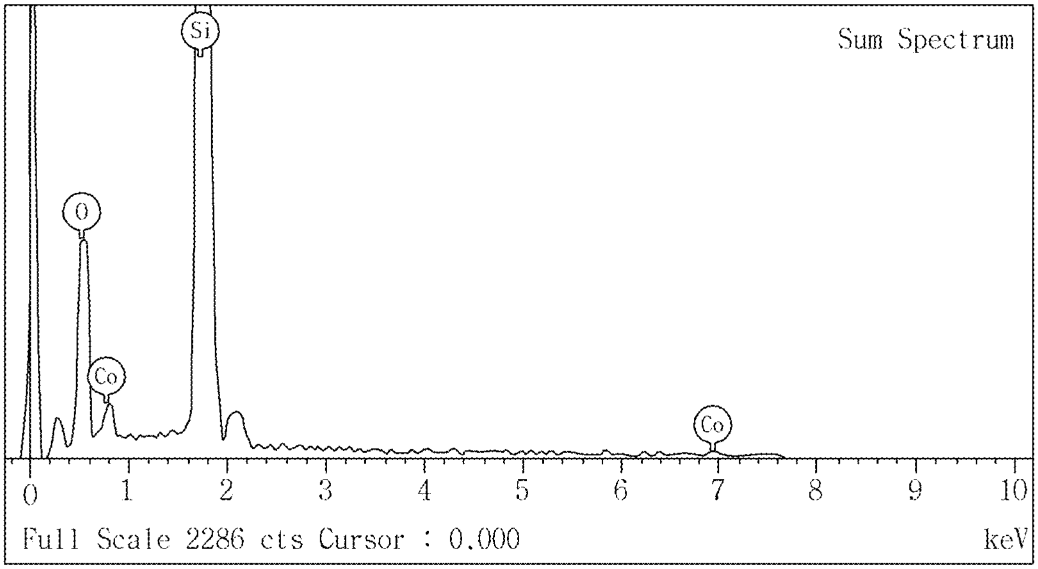
FIG. 5 illustrates the results of SEM-EDS analysis of the composite obtained according to an embodiment of the present invention.
Figure 6A:
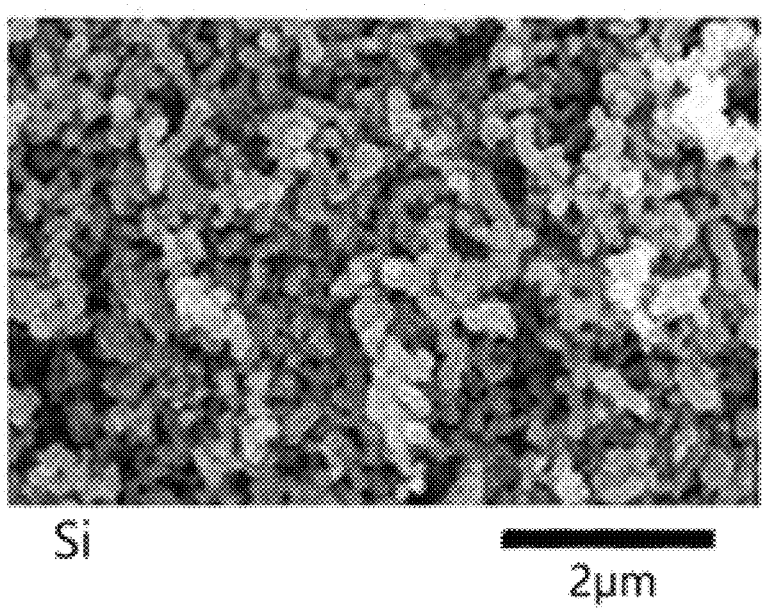
FIG. 6A illustrates a SEM photograph of pure silicon.
Figure 6B:
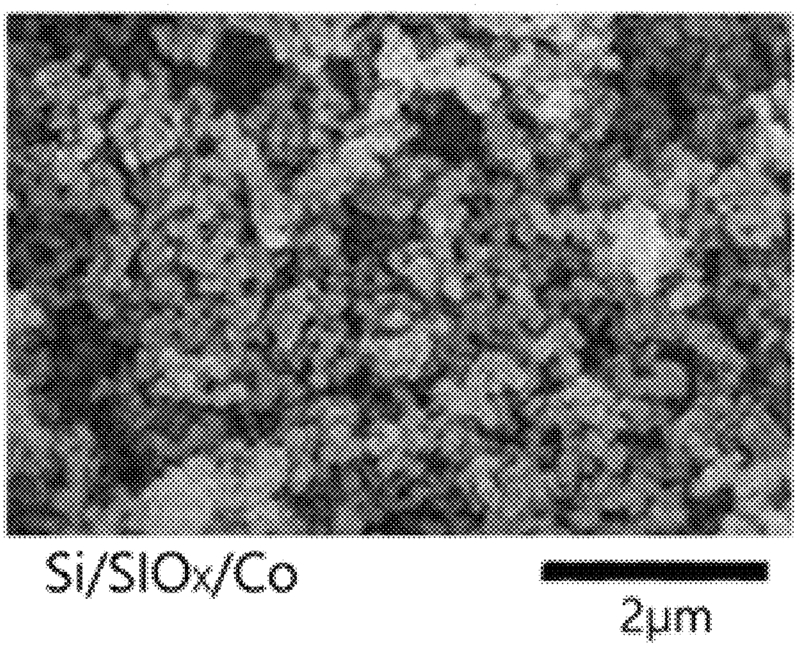
FIG. 6B illustrates a SEM photograph of a silicon oxide-cobalt composite.
Figure 6C:
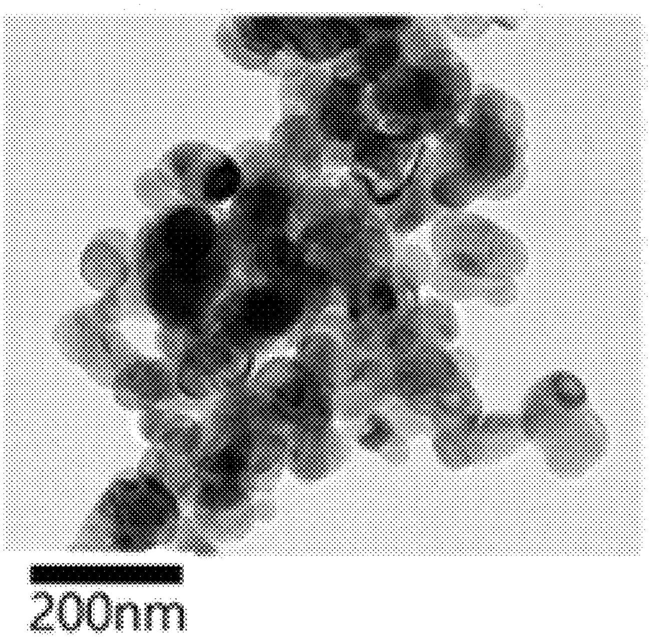
FIG. 6C illustrates a TEM photograph of pure silicon.
Figure 6D:
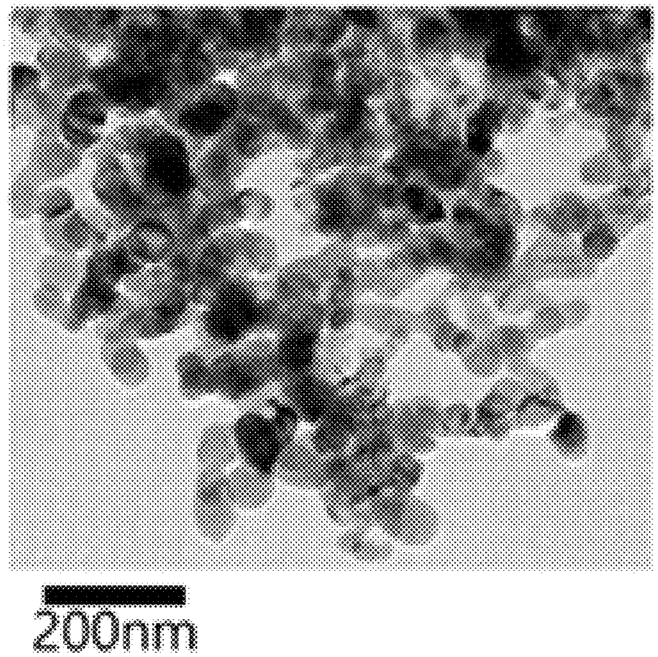
FIGS. 6D and 6E illustrate a TEM photograph of a silicon oxide-cobalt composite.
Figure 6E:
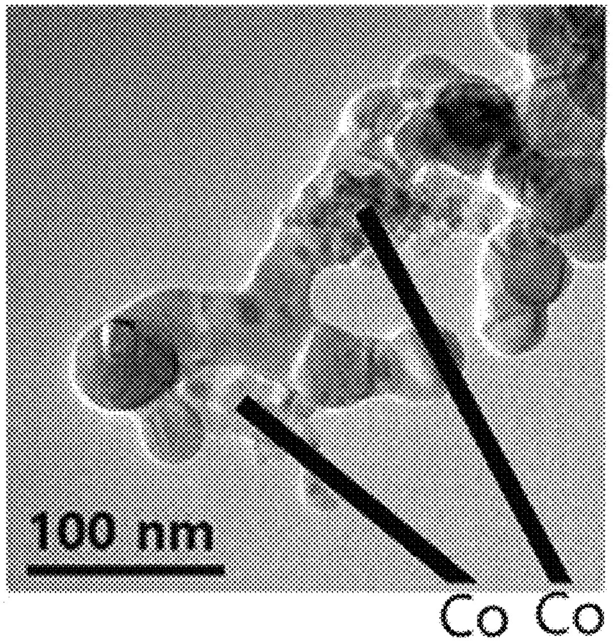
Figure 6F:
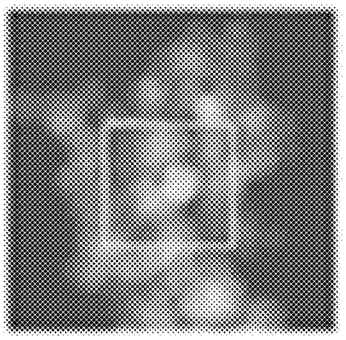
FIGS. 6F to 6H illustrate EDS mapping images of pure silicon.
Figure 6G:
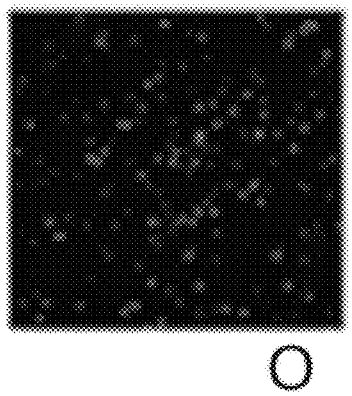
Figure 6H:
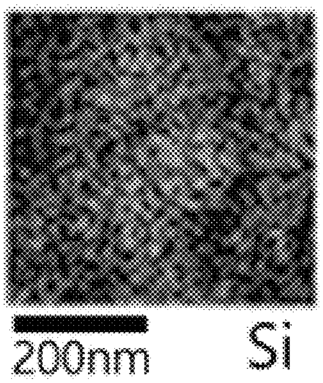
Figure 6I:
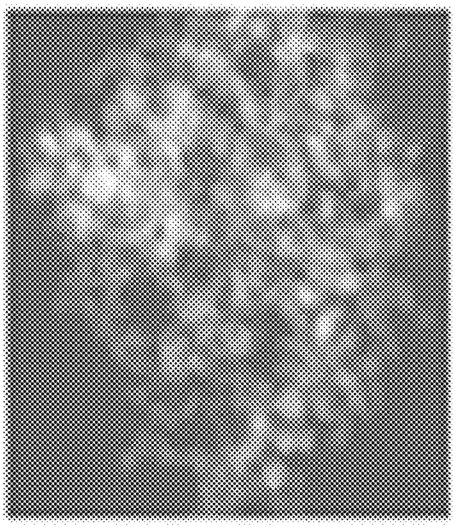
FIGS. 6I to 6L illustrate EDS mapping images of a silicon oxide-cobalt composite.
Figure 6J:
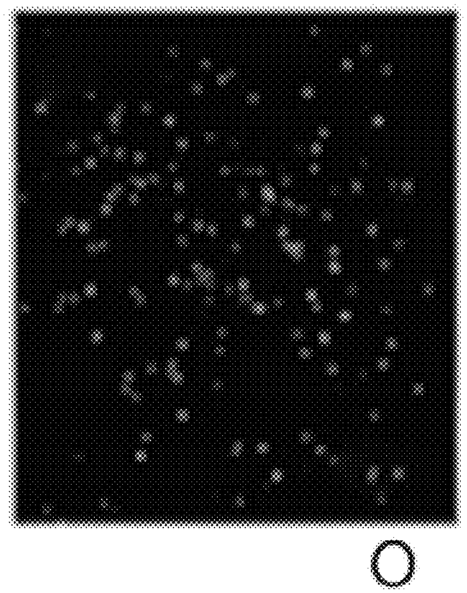
Figure 6K:
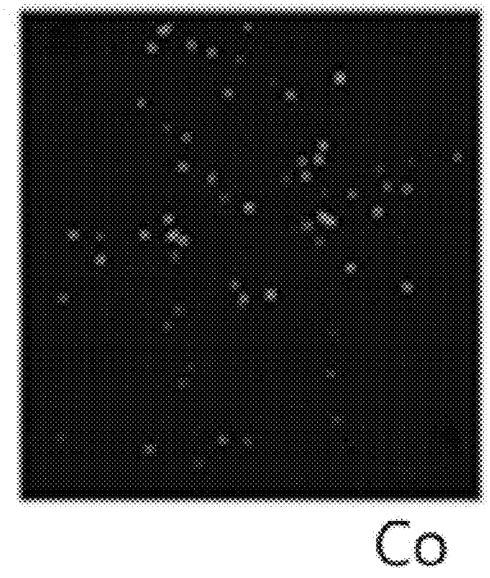
Figure 6L:
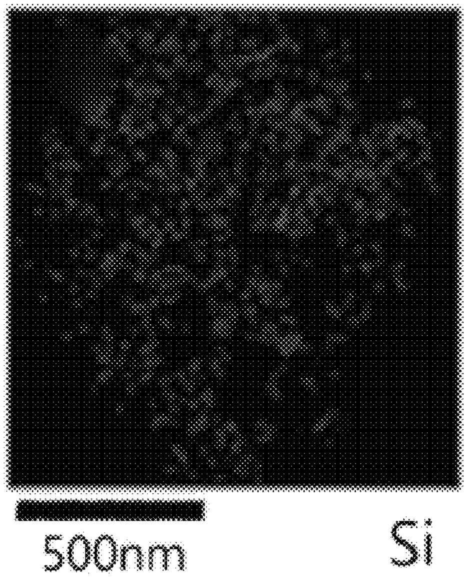

Meanwhile, as a result of analyzing the composite powder obtained in Example 1 by XPS and SEM-EDS, it was confirmed that amorphous silicon dioxide ($SiO_2$) was present (FIGS. 4 and 5).

Example 2. Preparation of Silicon Oxide-Cobalt Composite

A silicon oxide-cobalt composite was prepared in the same manner as in Example 1 above except that silicon (Si, diameter 100 nm) and cobalt oxide (CoO, diameter 50 nm) were prepared in a molar ratio of 13:1.

Example 3. Preparation of Silicon Oxide-Copper Composite

A silicon oxide-copper composite was prepared in the same manner as in Example 1 above except that copper oxide was prepared instead of cobalt oxide, and silicon (Si, diameter 100 nm) and copper oxide (CuO) were prepared in a molar ratio of 11:1.

Example 4. Preparation of Silicon Oxide-Copper Composite

A silicon oxide-copper composite was prepared in the same manner as in Example 1 above except that copper oxide was prepared instead of cobalt oxide, and silicon (Si, diameter 100 nm) and copper oxide (CuO) were prepared in a molar ratio of 13:1.

Experimental Example 1. Evaluation of Charge/Discharge Characteristics

Along with the four composites prepared in Examples 1 to 4, commercially available silicon (Sigma-Aldrich, USA) was prepared as Comparative Example, and their charge/discharge characteristics were evaluated. In order to evaluate electrochemical behavior, an electrode was prepared using the composites obtained in Examples 1 to 4 and the Si single compound prepared as Comparative Example, and an electrochemical test thereof was performed.

Specifically, 75% by weight of the materials of each Example and Comparative Example and 10% by weight of the brand name Super C as carbon powder were put in a mortar and mixed for 20 minutes. The mixture and 15% by weight of PAA were added to 5 ml of distilled water and mixed for 5 hours. The mixed liquid mixture was applied on a copper foil, and slurry casting was performed using a doctor blade. After drying in an oven at 80° C. for 2 hours or more and then drying in a vacuum oven at 120° C. for 12 hours, an electrode was prepared by punching with a diameter of 8 mm.

Together with the above electrodes, a polypropylene film (25 μm) was punched with a diameter of 13 mm and used as a separator, and the electrolyte was used by adding FEC at a concentration of 5% by weight to EC/DEC (volume ratio 1:1) containing 1M $LiPF_6$. A battery was prepared by punching and using a lithium metal with a diameter of 10 mm as a counter electrode.

The charge/discharge capacity of the batteries prepared by the above method were measured using Maccor Series 4000 at room temperature, and specifically measured at a C/20 rate in the range of 0.01 to 1.5 V. At this time, the C rate was calculated based on 200 mAh/g.

Figure 7:
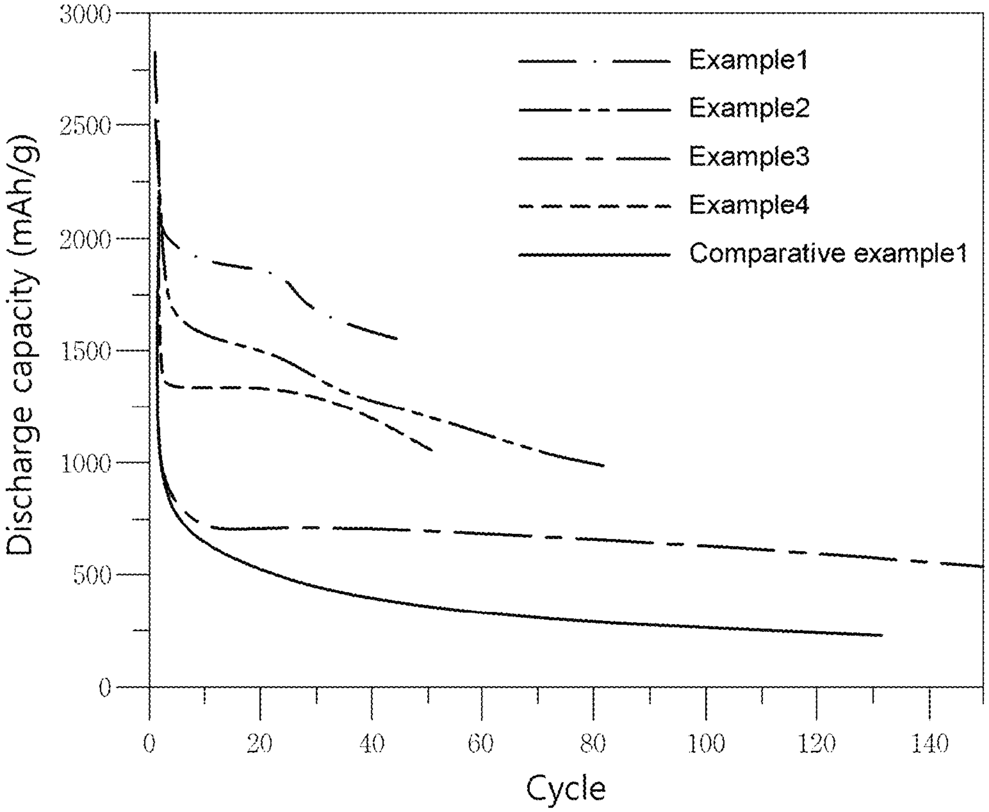
FIG. 7 illustrates the charging/discharging speed of an electrode using the composite obtained according to an embodiment of the present invention and a comparative example.
Figure 8A:
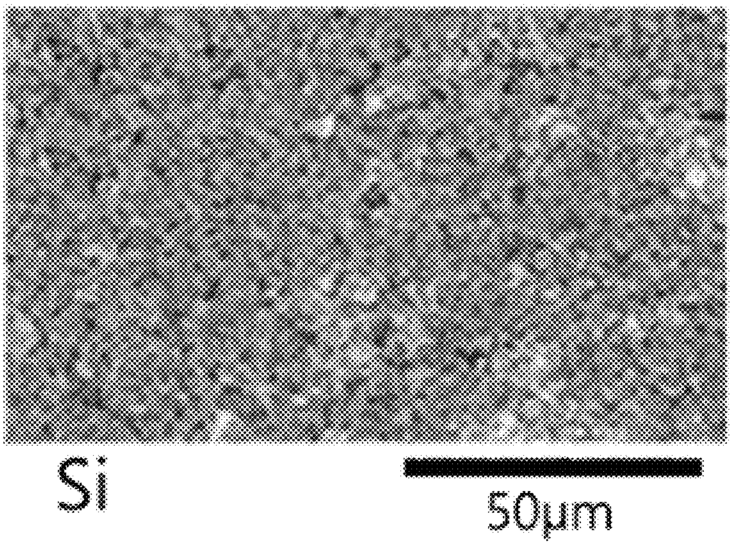
FIGS. 8A to 8F illustrate an SEM image for confirming the mechanical performance of negative electrodes made of the composite and pure silicon obtained according to an embodiment of the present invention.
Figure 8B:
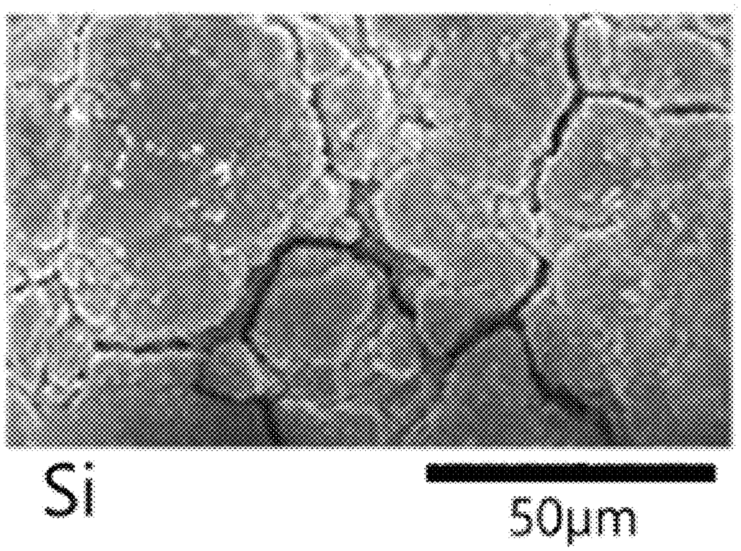
Figure 8C:
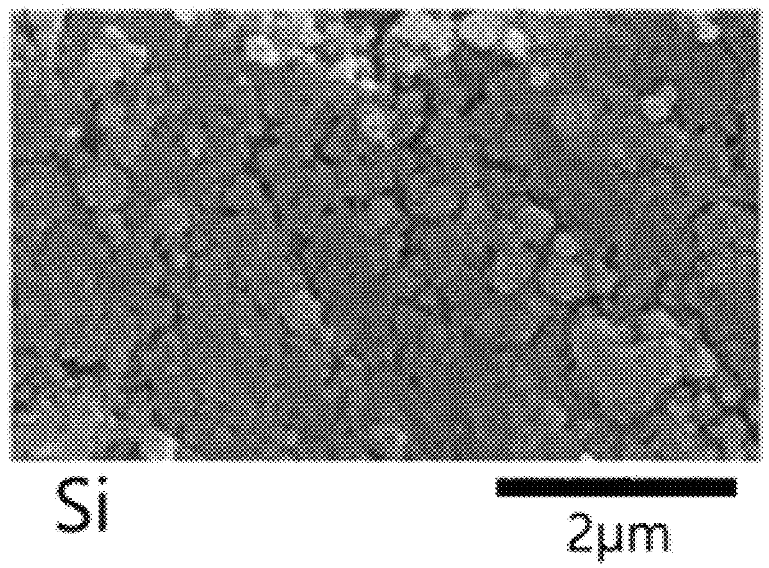
Figure 8D:
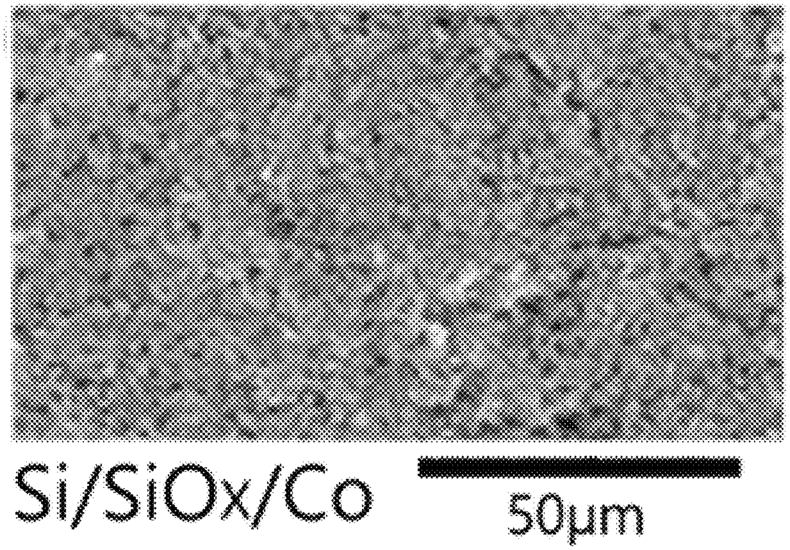
Figure 8E:
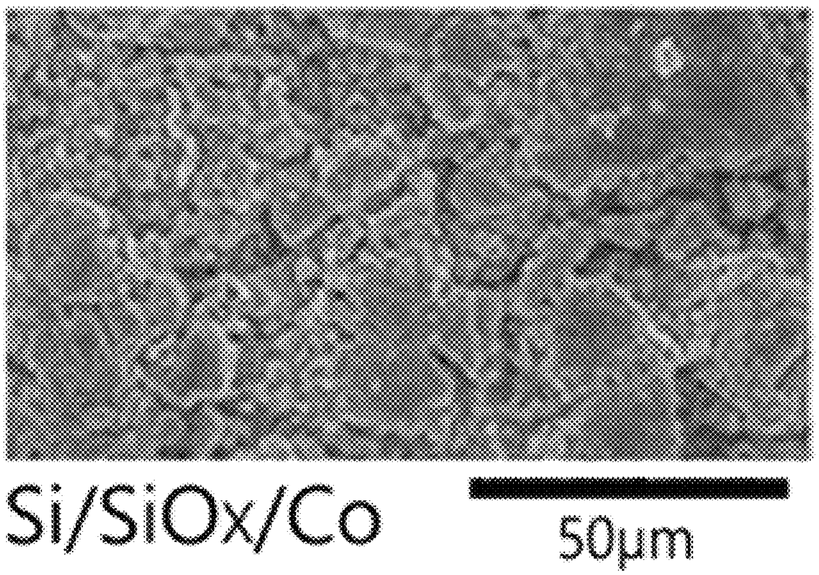
Figure 8F:
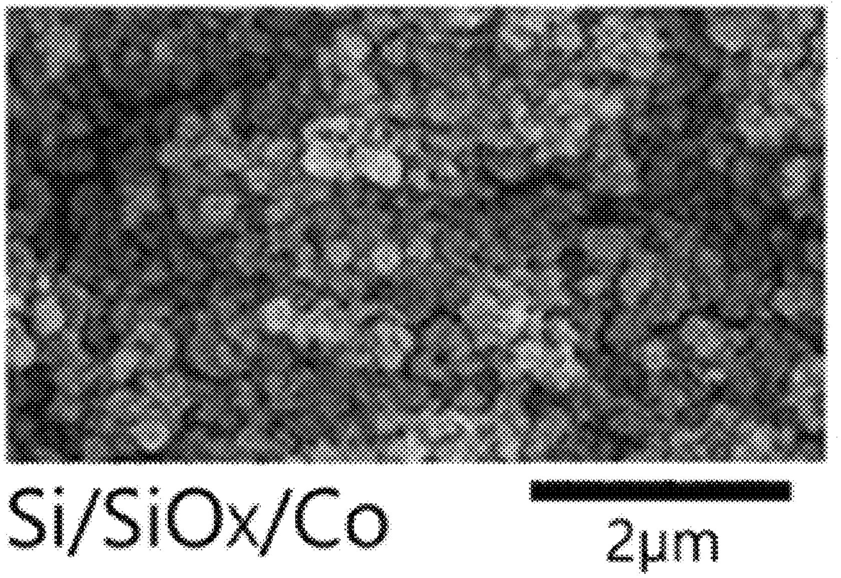

As shown in FIG. 7, in the case of the materials obtained in Examples 1 to 4 of the present invention, the discharge capacity was maintained even up to 50 cycles or more, whereas in the case of Comparative Example, the discharge capacity gradually decreased. Therefore, it was confirmed that the electrochemical properties of the material according to the embodiment of the present invention are more excellent.

The above description of the present invention is for illustrative purposes only, and those of ordinary skill in the art to which the present invention pertains should be able to understand that modification into other specific forms can be easily performed without changing the technical idea or essential features of the present invention. Therefore, it should be understood that the embodiments described above are illustrative and non-limiting in all respects. For example, each component described as a single type may be implemented in a distributed manner, and similarly, components described as being distributed may also be implemented in a combined form.

The scope of the present invention is indicated by the claims to be described below, and all changes or modified forms derived from the meaning and scope of the claims and their equivalent concepts should be construed as being included in the scope of the present invention.

INDUSTRIAL APPLICABILITY

The present invention provides a method for preparing a negative electrode active material including a silicon oxide-metal composite that can be used as a negative electrode material for a lithium secondary battery, and provides a negative electrode capable of improving the characteristics of a lowered lifespan by solving the issue of irreversible capacity due to volume change, which is a problem of a conventional silicon-based negative electrode, and a lithium secondary battery including the same.

The invention claimed is:

1. A method of preparing a negative electrode active material for a lithium secondary battery, comprising the steps of:

uniformly mixing silicon and a metal oxide, wherein the silicon and the metal oxide are mixed in a molar ratio of 13:1 to 19:1; and heating or ball-milling the mixture, wherein the metal oxide is an oxide of one or more selected from the group consisting of Co, Ni, Mn, Fe, Sn, Ag, Au, and Mo, wherein the method is to form silicon dioxide-metal composite.

2. The method according to claim 1, wherein the silicon dioxide-metal composite is formed by attaching metal particles on silicon oxide particles.

3. The method according to claim 1, wherein the heating step is performed at 400° C. to 2,000° C.

4. The method according to claim 3, wherein the heating step is performed for 15 hours to 45 hours.

5. The method according to claim 1, wherein the ball-milling step is performed at 100 rpm to 1,500 rpm.

6. The method according to claim 5, wherein the ball-milling step is performed for 1 hour to 24 hours.

7. The method according to claim 1, further comprising the step of treating the silicon with an acid prior to the mixing step.

8. The method according to claim 1, wherein a particle diameter of the silicon is 10 nm to 100 μm.

9. The method according to claim 1, wherein a particle diameter of the metal oxide is 5 nm to 100 μm.

10. The method according to claim 1, further comprising, prior to the uniformly mixing:

pre-treating the silicon with a hydrofluoric acid.

* * * * *